United States Patent [19]

Toda et al.

[11] Patent Number: 5,859,364
[45] Date of Patent: Jan. 12, 1999

[54] SCANNING PROBE MICROSCOPE

[75] Inventors: Akitoshi Toda, Kunitachi; Takeshi Konada, Tokyo, both of Japan

[73] Assignee: Olympus Optical Co., Ltd., Tokyo, Japan

[21] Appl. No.: 656,075

[22] Filed: May 31, 1996

[30] Foreign Application Priority Data

Jun. 5, 1995 [JP] Japan .................................. 7-137762

[51] Int. Cl.$^6$ .................................................. G01B 11/30
[52] U.S. Cl. ............................................ 73/105; 250/306
[58] Field of Search ............................. 73/105; 250/306, 250/307

[56] References Cited

U.S. PATENT DOCUMENTS

| | | | |
|---|---|---|---|
| 3,589,815 | 6/1971 | Hosterman | 356/375 |
| 4,726,685 | 2/1988 | Koboyashi et al. | 356/445 |
| 4,743,770 | 5/1988 | Lee | 356/376 |
| 5,241,364 | 8/1993 | Kimura | 356/351 |
| 5,260,569 | 11/1993 | Kimura | 250/234 |
| 5,260,824 | 11/1993 | Okada et al. | 73/105 X |
| 5,272,330 | 12/1993 | Betzig et al. | 250/216 |
| 5,294,790 | 3/1994 | Ohta et al. | 250/306 X |
| 5,294,804 | 3/1994 | Kojimura | 250/306 X |
| 5,394,741 | 3/1995 | Kojimura et al. | 73/105 |
| 5,408,094 | 4/1995 | Kojimura | 250/306 X |
| 5,539,197 | 7/1996 | Courjon et al. | 250/306 X |

FOREIGN PATENT DOCUMENTS

| | | |
|---|---|---|
| 6-137847 | 5/1994 | Japan . |
| 2181539 | 4/1987 | United Kingdom . |

OTHER PUBLICATIONS

*McGraw–Hill Dictionary of Scientific and Technical Terms*, 2nd Edition p. 1009 definition of "Nomarski Microscope" and depiction of Application of Nomarski interference microscope to a metallurgical specimen copyright 1976 month not given.

Article entitled "Near–Field Optical Microscope Using A Silicon–Nitride Probe", by N.F. van Hulst, eet al, Appl. Phys. Letter 62(5) Feb. 1, 1993 pp. 461–463.

*McGraw–Hill Dictionary of Scientific and Technical Terms*, 4th edition p. 1279 definition of "Nomarski Microscope" and p. 1297 definition of numerical aperture undated 5, Feb. 1997.

*Patent Abstracts of Europe* "Optoelectronic stop motion" (DE 3803751) Aug. 17, 1989 Schoeller et al.

*Patent Abstracts of Europe* "Intelligent Sensor for Near Field Optical Device" (WO 95–3561) Feb. 2, 1995 Fillard et al.

*Patent Abstracts of Europe* "Near–Field Optical Microscope" (WO 95–10060) Apr. 13, 1995 Hecht et al.

*Patent Abstracts of Japan* "Optical Surface Roughness Sensor" (7–294231) Nov. 10, 1995 Tamaki et al.

*Primary Examiner*—Thomas P. Noland
*Attorney, Agent, or Firm*—Frishauf, Holtz, Goodman, Langer & Chick

[57] ABSTRACT

A slide glass with a sample rested thereon is placed on an interior total reflection prism with a matching oil between them. A laser beam is applied through a prism to the sample, and evanescent light is generated on the sample surface. Above the sample, a probe supported at a free end of a cantilever is located, and an objective is provided above the probe. The objective has an angular aperture exceeding a vertical angle of the probe, where the angular aperture indicates an angle from a focal point of the objective to a diameter of entrance pupil. A scattering light detection lens barrel is provided above the objective, and cooperates with the objective to constitute a scattering light detection optical system. The optical system detects scattering light generated when the probe is introduced to the evanescent light.

20 Claims, 7 Drawing Sheets

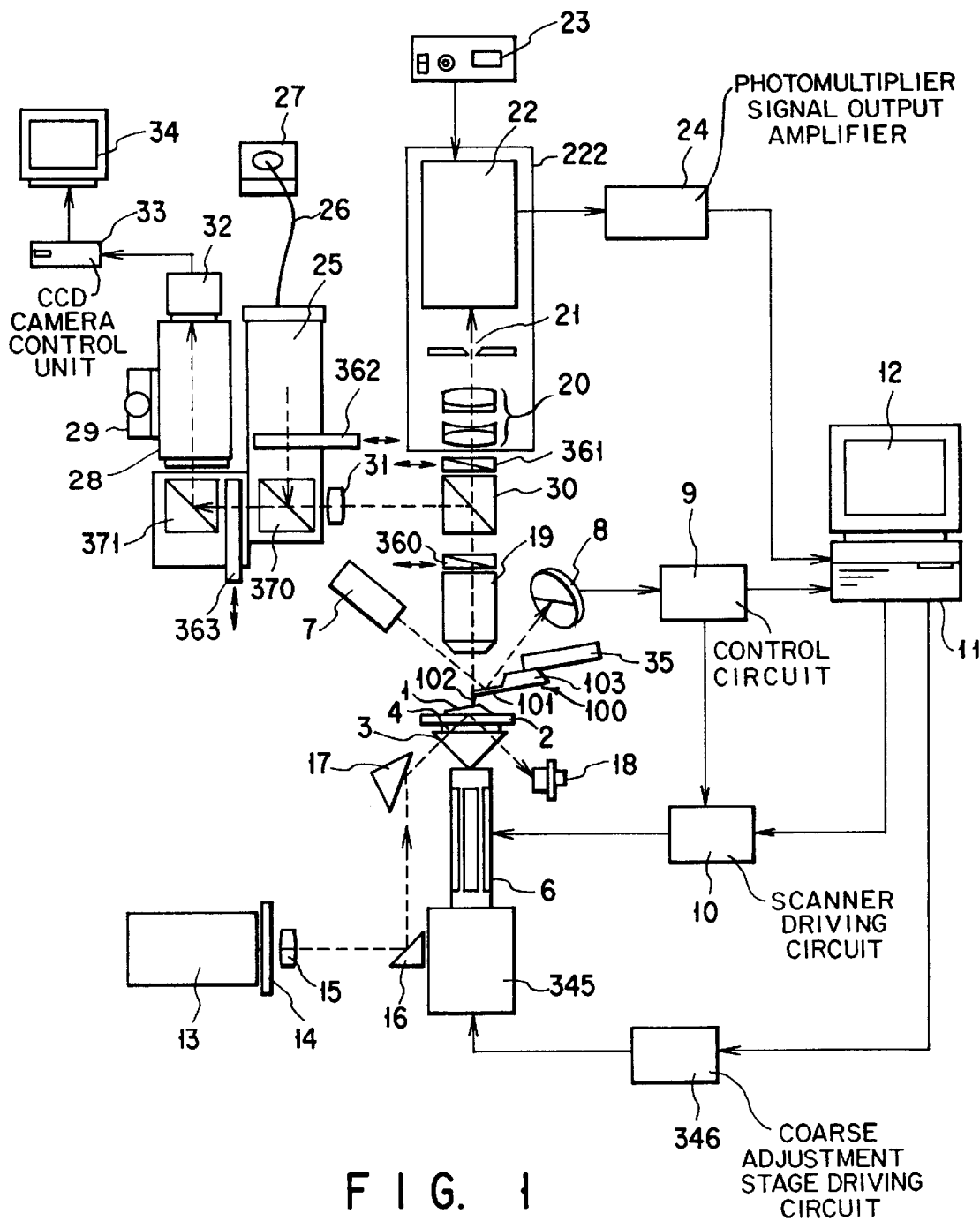
F I G. 1

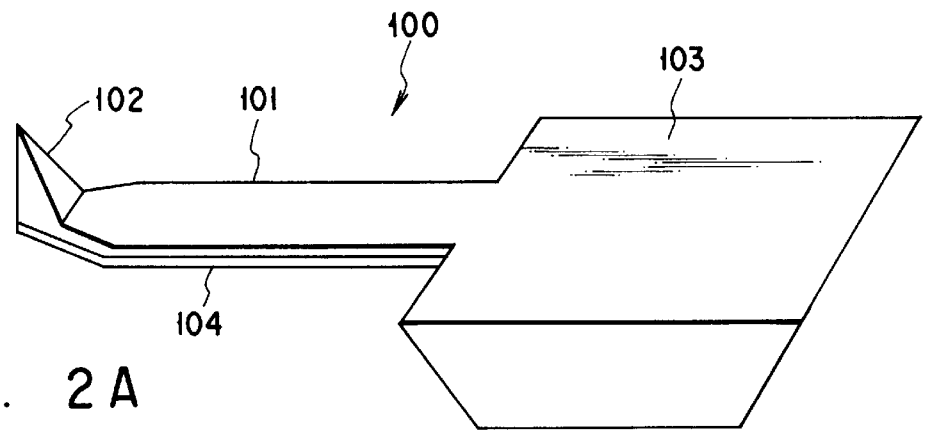
F I G. 2A
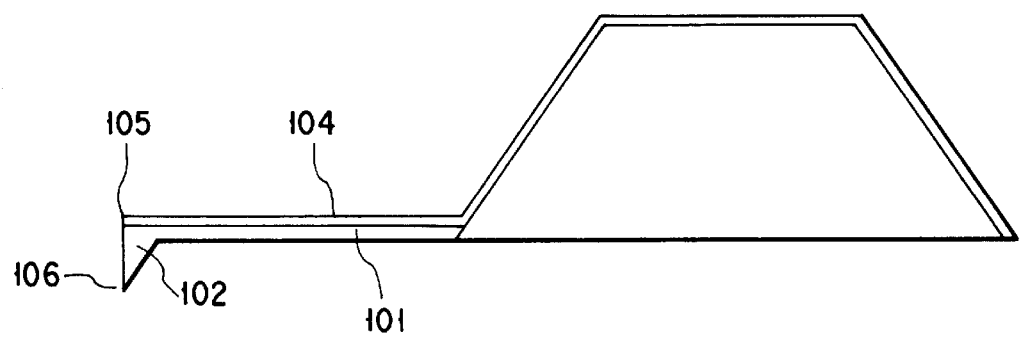
F I G. 2B
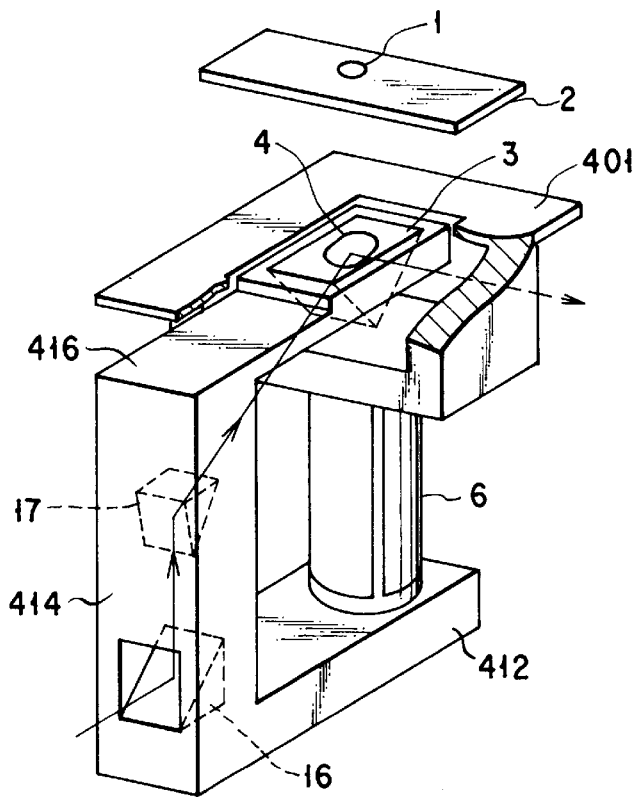
F I G. 3

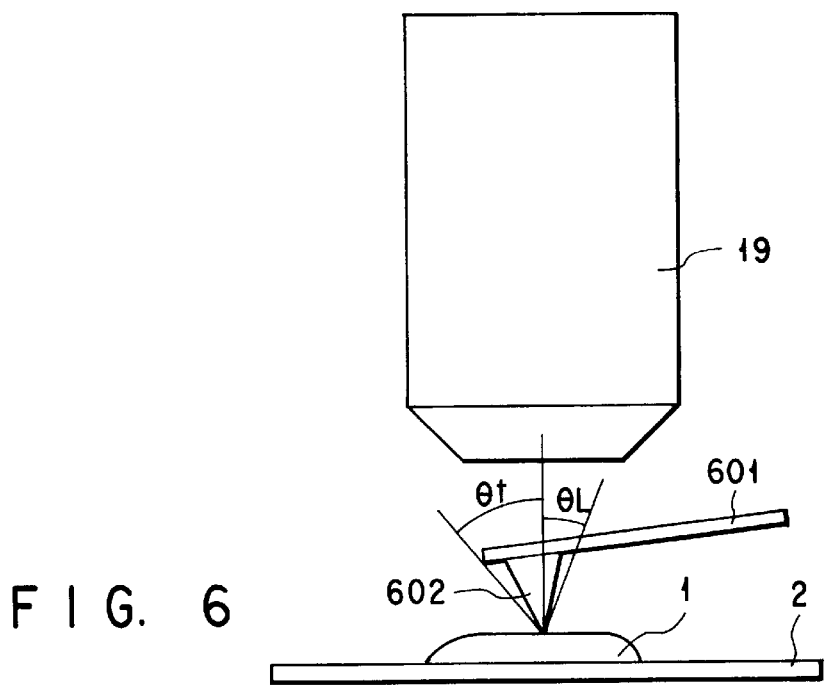
F I G. 6
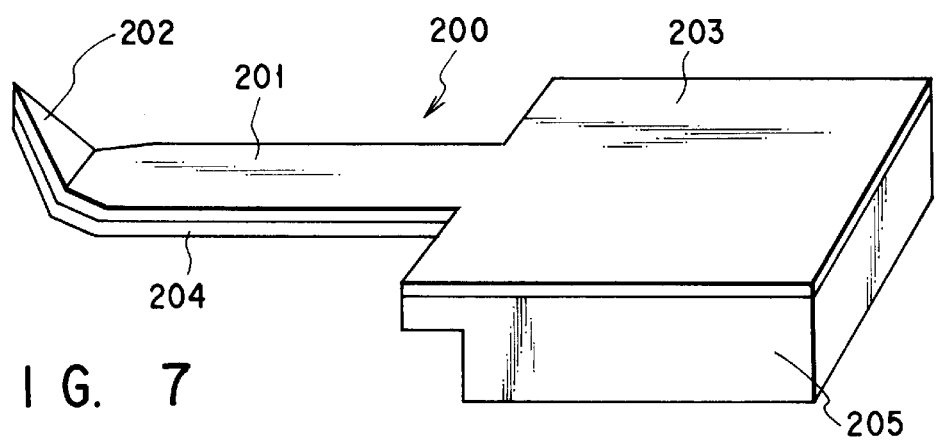
F I G. 7
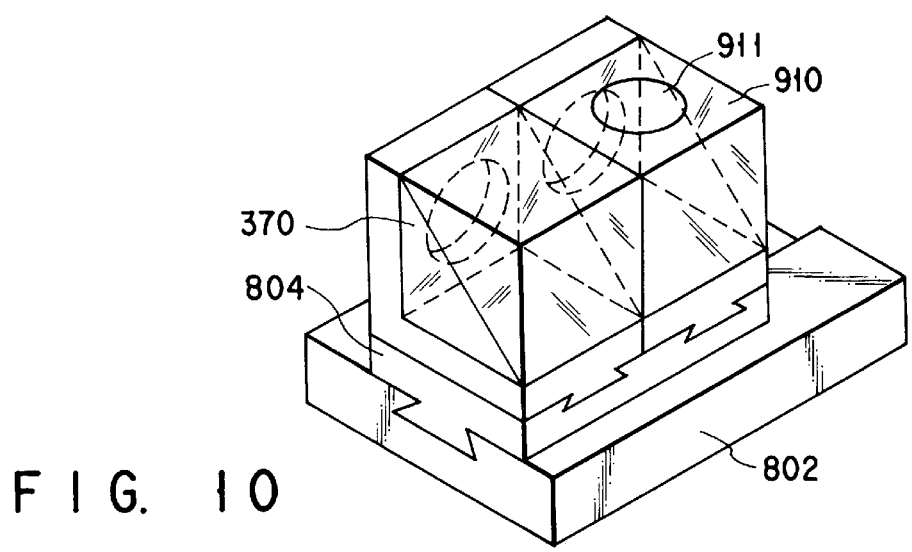
F I G. 10

SCANNING PROBE MICROSCOPE

BACKGROUND OF THE INVENTION

1. Field of the Invention

The present invention relates to a scanning probe microscope for obtaining optical information relating to a surface of a sample by using a probe. The present invention relates, for example, to a scanning near-field optical microscope.

2. Description of the Related Art

The term "scanning probe microscope (SPM)" generically represents an apparatus for detecting an interactive effect caused between a probe and a surface of a sample when the probe is at a distance of 1 μm or less from the surface, while the probe is scanned in the X and Y or X, Y and Z directions, and for mapping the interactive effect in a two-dimensional manner, The term SPM inclusively encompasses, for example, scanning tunneling microscopes (STMs), atomic force microscopes (AFMs), magnetic force microscopes (MFMs), and scanning near-field optical microscopes (SNOMs).

SNOMs have been developed specifically since the second half of the 1980s as optical microscopes capable of achieving a resolution that is higher than a diffractometric limit by detecting an evanescent wave, and such property of the evanescent wave is employed in the principle of measurement so that the evanescent wave is localized in a region dimensionally less (in thickness) than a wavelength, and never propagated in a free space.

U.S. Pat. No. 5,272,330 issued to Betzig et al. on Dec. 12, 1993, discloses an SNOM. In the SNOM, an evanescent field is generated in the vicinity of a fine aperture in a tip of a probe by introducing a light to the probe which is tapered in the leading end thereof. The evanescent field is brought into contact with a sample, light caused by the contact between the evanescent field and the sample is detected by means of an optical detector which is placed below the sample, and the intensity of transmitted light is mapped in a two-dimensional manner.

In the SNOM, a bar-shaped probe is employed as an optical fiber or glass bar or crystal probe with a tapered tip. An improved bar-shaped probe coated, except in a tip area thereof, with a metal film is now commercially available. The probe is produced by rotating a bar-shaped probe such an optical fiber or glass bar or crystal probe with a tapered tip, while a metal is deposited thereon from behind it at an angle. An apparatus using such a probe provides a lateral resolution higher than that of an apparatus using a probe without a metal coating.

On the other hand, the AFM is the most popular of SPMs as an apparatus for obtaining information of configuration of a sample surface. In the AFM, the information on configuration of a sample is obtained indirectly by detecting displacement of a cantilever which is caused in response to a force acting on a probe by means of an optical displacement sensor, for example, when the probe supported in a distal end of the cantilever is brought to the vicinity of the surface of the sample. One type of AFM is disclosed, for example, in Japanese Patent Publication No. 62-130302.

The technique for measuring configuration of a sample by detecting an interactive force between a sample and a probe tip in the AFM is also applied to other SPMs, and is used as means for constantly maintaining a distance between a sample and probe tip, that is, so-called regulation.

N. F. van Hulst et al. suggested a novel SNOM for detecting optical information of a sample, while configuration of the sample is measured according to the AFM measurement technique by using a cantilever of silicon nitride. This novel SNOM is disclosed in Appl. Phys. Lett., 62 (5), p. 461 (1993). In the apparatus, the sample is placed on an internal total reflection prism, a HeNe laser beam is applied from the side of the total reflection prism to the sample, the sample is excited, and an evanescent light field is generated in the vicinity of a surface of the sample. Then, a probe supported in a distal end of the cantilever is inserted to the evanescent light field, the evanescent light field, which comprises a localized wave, is converted to scattering light which comprises a propagating wave. A part of the light propagates through the inside of the probe of silicon nitride which is almost transparent to the HeNe laser beam and out of a back side of the cantilever. The light is collected by a lens located above the cantilever, and applied to a photomultiplier through a pinhole which is provided in a position conjugate with the probe tip in respect to the lens, and an SNOM signal is outputted from the photomultiplier.

While the SNOM signal is detected, the cantilever is measured for displacement thereof by an optical displacement detecting sensor, and a piezoelectric scanner, for example, is feedback-controlled so that the displacement is maintained to a predetermined value. Thus, in a scanning operation, an SNOM measurement is achieved according to scanning and SNOM signals, and an AFM measurement is achieved according to scanning and feedback control signals.

In the SNOM of either Betzig et al. or N. F. van Hulst et al., the probe tip is required to be optically transparent. In addition, to achieve a high lateral resolution for an SNOM image, the probe is desirably coated with metal. However, it is not easy to uniformly mass-produce such a metal-coated probe having an aperture in a tip thereof. In the SNOM expected for a super-resolution, a resolution higher than that achievable by the usual optical microscope is demanded, and the diameter of the aperture in the probe tip is required to be 0.1 μm or less, preferably 0.05 μm or less, in order to achieve such resolution. It is very difficult to produce an aperture of such size with a high reproducibility.

Furthermore, because an amount of light applied to the probe through the aperture is reduced in proportion to the second power of a diameter of the aperture, it is a problem of trade-off that an amount of light detected is reduced, if a diameter of the aperture is reduced for providing a higher lateral resolution of an SNOM image, and the S/N of a detection system is lower.

In the SNOM of N. F. van Hulst et al., since light transmitted through the probe of silicon nitride is detected, it is difficult to detect evanescent light in a range of short wavelengths. For example, a silicon nitride film is significantly reduced in spectral transmittance at a wavelength of 450 nm or less, even if the stoichiometry of silicon and nitrogen is 3:4. For a silicon nitride film for a cantilever, those with a higher content of silicon are generally employed in order to provide a silicon nitride film of low stress. In such silicon-rich silicon nitride film, reduction of the spectral transmittance in the range of short wavelengths is more significant. Therefore, the SNOM measurement using a cantilever of silicon-rich silicon nitride in the range of short wavelengths is almost unachievable, or the S/N is very poor, even if it is achieved.

A novel SNOM without an aperture in a probe tip is proposed. With the SNOM, because it is not required to provide an aperture in a probe tip, such difficulty in producing an aperture and problem of trade-off as described above are avoided. The novel SNOM is also referred to as a scattering mode SNOM, since scattering light propagating outside a probe is detected as SNOM information. Owing to the detecting method, a problem of difficulty in detecting evanescent light in the range of short wavelengths is also avoided.

In Japanese Laid-open Patent 6-137847, a scattering mode SNOM is disclosed. The SNOM converts evanescent light formed on a surface of a sample to propagating light by scattering it with a needle-like probe, detects the propagating or scattering light by using a condenser lens located in a side of the probe and a photoelectric detector, and provides optical information of the sample according to the detected signal.

In the SNOM, because the probe and a scanner for scanning the probe in the X, Y and Z directions are provided above the sample, an objective of an optical microscope cannot be placed above the sample. Thus, an optical microscopic observation must be conducted either in the oblique or lateral direction. In such optical microscopic observation, it is difficult to determine a position of the probe on the sample at a high accuracy. It is also difficult to achieve a variety of general optical microscopic observations, polarization microscopic observation and Nomarski differential interference microscopic observation, for example. Besides, the objective may not be of high magnification and high NA, and it is, therefore, difficult to observe the sample at the high resolution. This is significantly disadvantageous for carrying out an SNOM measurement while simultaneously referring to a result of optical microscopic observation.

At the 42th Seminar of Japan Applied Physics Related Associations (Prepared Papers No. 3, p. 916, March, 1995), Kawata et al. disclosed an apparatus capable of achieving STM and SNOM analyses using a metal probe for the STM. In the apparatus, propagating light is generated when evanescent light produced on a surface of sample is scattered by a tip of the metal probe. The propagating light, thus generated, is detected with a detector located at the side of the probe and sample, while a distance between the sample and the probe is controlled by the STM.

In the apparatus of Kawata et al., because the distance between the sample and probe is controlled by the STM, samples to be observed are limited to those having an electrical conductivity. Such limitation is very disadvantageous, since nonconductive samples are generally much common than conductive ones.

SUMMARY OF THE INVENTION

An object of the invention is to provide a scanning probe microscope for achieving AFM and scattering mode SNOM measurements simultaneously at a high S/N.

Another object of the invention is to provide a scanning probe microscope for achieving a variety of general optical microscopic observations.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 illustrates a schematic representation showing an overall constitution of a scanning probe microscope according to the invention;

FIG. 2A shows a perspective view of a cantilever tip of tetrahedral type employed in the apparatus in FIG. 1;

FIG. 2B shows a side view of the cantilever tip in FIG. 2A;

FIG. 3 shows a perspective view of structures about an internal total reflection prism;

FIG. 6 is an illustration for explaining a preferred shape of the cantilever;

FIG. 7 shows a perspective view of another cantilever of bird's beak type employed in the apparatus in FIG. 1;

FIG. 10 shows a perspective view of a system for changing between half mirror prisms for dark field and bright field illuminations.

DETAILED DESCRIPTION OF THE PREFERRED EMBODIMENTS

Figure 4:
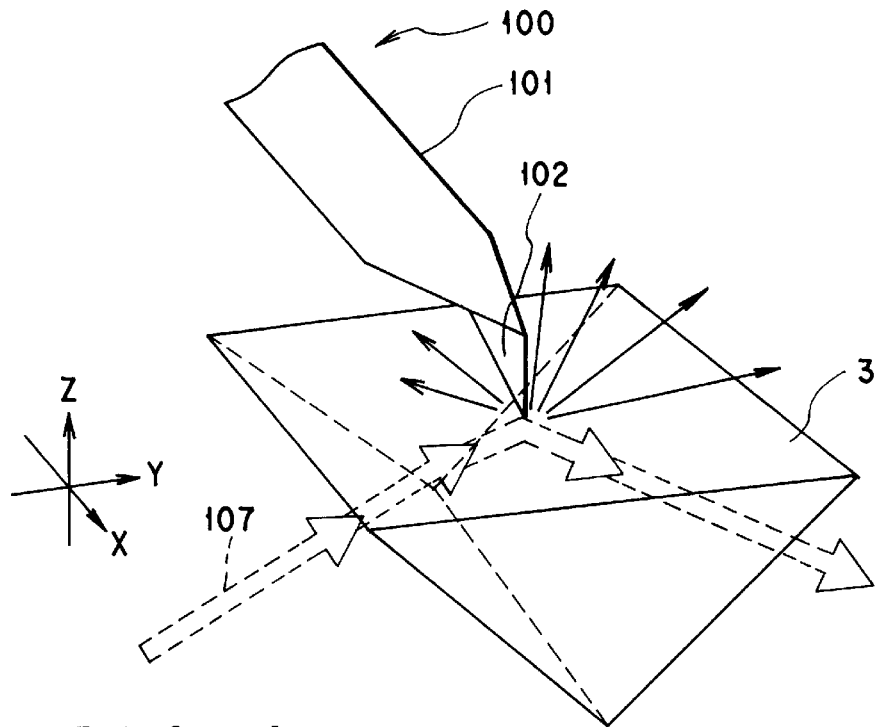
FIG. 4 is an illustration for explaining the direction of positioning the cantilever.

Embodiments of a scanning probe microscope according to the invention will be described below by referring to the accompanying drawings.

The apparatus is provided with a cantilever tip 100 produced with single crystal silicon by a semiconductor processing method. The cantilever tip 100 is supported, as shown in FIG. 1, above a sample 1 by a tip holding mechanism 35. The cantilever tip 100 is of so-called tetrahedral type, and, as shown in FIGS. 2A and 2B, comprises a support portion 103, a cantilever 101 extending from the support portion 103 and a probe 102 of a tetrahedral shape provided at a distal end of the cantilever. The cantilever 101 has a 240 $\mu$m length and about a 3 $\mu$m thickness, and has a shape which comprises a rectangular strip and an isosceles triangle joined to the rectangular end, where the rectangular strip has a 207 $\mu$m length and 30 $\mu$m width, and the isosceles triangle has a vertical angle of 48.5°. The probe 102 has a vertical angle of 35° and a height of about 10 $\mu$m, and a probe tip 106 is located right below a distal end 105 of the cantilever 101, as shown in FIG. 2B. A back side of the cantilever 101 is coated with an aluminum film 104 80 nm in thickness.

The apparatus comprises an optical lever type displacement sensor for detecting displacement of the free end of cantilever 101, which is provided with a semiconductor laser 7 for emitting a light beam to the cantilever 101 and a two-piece photodetector 8 for receiving a reflected light from the cantilever 101. A laser beam emitted from the semiconductor laser 7 is directed to the cantilever 101, reflected by the aluminum film 104 in the back side of the cantilever, and received by the two-piece photodetector 8. The aluminum film 104 appropriately reflects the light, which contributes to the detection of displacement at a high S/N. The displacement of free end of the cantilever 101 causes change in position of incidence of the reflected light to the two-piece photodetector 8, such that the output ratio between receivers of the two-piece photodetector 8 is varied. Thus, by examining a difference between outputs of the receivers of two-piece photodetector 8, the displacement of free end of the cantilever 101 can be determined, and that of the probe 102 is obtained even indirectly.

Although the laser beam is most preferably directed to the back side of the probe 102 in order to determine a precise displacement of the probe 102, in practice, a point slightly to the support portion 103 is selected to avoid mixture with scattering light during SNOM measurement.

As shown in FIG. 3, a piezoelectric tube scanner 6 is secured on a base 412, and a sample table 401 is fixed to an upper end of the piezoelectric tube scanner 6. In an end of the base 412, a support pole 414 is provided, and a horizontally extending arm 416 is employed in an upper part of the support pole 414. At a leading end of the arm 416, an internal total reflection prism 3 is secured, and the internal total reflection prism 3 is located in an inner cavity of the sample table 401, and exposed through an opening in the middle of an upper surface of the sample table 401.

A slide glass 2 with the sample 1 placed thereon is rested on the sample table 401 after an appropriate amount of matching oil 4 is applied to the upper surface of internal total reflection prism 3. As a result, as shown in FIG. 1, the matching oil 4 is held between the slide glass 2 and internal total reflection prism 3, and they are optically coupled with each other. The structural element shown in FIG. 3 is located on a coarse adjustment stage 345, as schematically illustrated in FIG. 1. The coarse adjustment stage 345 is driven by a coarse adjustment stage driving circuit 346 which is controlled by a computer 11, and serves for coarsely moving the structural element in a three dimensional manner. In such way, coarse alignment between the sample 1 and probe 102 is achieved, and a distance between the sample 1 and probe 102 is coarsely adjusted.

In FIG. 1, the piezoelectric tube scanner 6 is driven by a scanner driving circuit 10 which is controlled by a control circuit 9 and the computer 11, such that the sample table 401 is moved in a three dimensional manner. Thus, the sample 1 on the slide glass 2 rested on the sample table 401 is moved in a three dimensional manner in relation to the probe 102. Accordingly, the probe 102 is scanned across the surface of sample 1, and a distance between the surface of sample 1 and the tip of probe 102 is also finely adjusted. In the specification, scanning operation for the probe across the surface of sample is referred to as XY scanning, and adjustment of the distance between the probe tip and the sample surface also as Z control. Each of strokes of XY scanning by the piezoelectric tube scanner 6 is approximately 30 μm, and that of Z control approximately 5 μm. As already explained by referring to FIG. 3, because the internal total reflection prism 3 is supported independently of the sample table 401 by the arm 416, the internal total reflection prism 3 is maintained stationarily without being affected by movement of the sample table 401 during scanning operation.

The apparatus is provided with means for generating an electromagnetic field between the probe and sample. The electromagnetic field generating means comprises means for generating a localized electromagnetic field which is localized and does not propagate, and means for generating a propagating electromagnetic field which propagates, and either of them is selectively operated. Here, the localized electromagnetic field indicates an electromagnetic field that does not propagate in a space, and corresponds, for example, to evanescent light. On the other hand, the propagated electromagnetic field indicates an electromagnetic field that propagates in a space, and corresponds, for example, to conventional propagating light.

In a description below, first, the localized electromagnetic field generating means is explained, and the propagating field generating means will be described later.

In FIG. 1, the localized electromagnetic field generating means, that is, evanescent light generating means comprises a laser beam source 13, filter 14, lens 15, two mirrors 16 and 17 and internal total reflection prism 3. For the laser beam source 13, an argon laser providing an output of 25 mW, for example, is employed. A laser beam emitted from the laser beam source 13 is converted to a parallel beam by the lens 15, after it passes through the filter 14. The parallel laser beam is reflected sequentially by the mirrors 16 and 17, then, enters the internal total reflection prism 3 at an angle of 48.5° to an upper surface thereof. The beam introduced to the internal total reflection prism 3 is totally reflected at an interface between the slide glass 2 and sample 1 or that between the sample 1 and atmosphere. As a result, evanescent light is generated in the vicinity of the surface of sample 1. It is described here that the beam is totally reflected at an interface between the slide glass 2 and sample 1 or that between the sample 1 and atmosphere, because phenomena in relation with evanescent light has not been revealed in a strict sense, and a reflecting interface, therefore, cannot be specified.

The localized electromagnetic field generating means, that is, evanescent light generating means further comprises a photodetector 18 for monitoring the beam reflected at the interface between the slide glass 2 and sample 1 or that between the sample 1 and atmosphere. The photodetector 18 is used, for example, for confirming whether the beam entering the internal total reflection prism 3 is totally reflected in an adequate manner or not.

As shown in FIG. 1, an objective 19 is located above the internal total reflection prism 3, with the sample 1 and probe 102 located between them. The objective has an angular aperture exceeding the vertical angle of probe 102. Here, the angular aperture represents an angle from a focal point of the objective 19 to the diameter of an entrance pupil, in other words, a maximum angle of cone of luminous flux entering the objective, and the sine of a half angle thereof corresponds to the numerical aperture of the objective 19. A scattering light detection lens barrel 222 is located above the objective 19, and cooperates with the objective 19 to constitute a scattering light detection optical system. The scattering light detection optical system detects scattering light generated when the probe is inserted to the evanescent light.

The scattering light detection lens barrel 222 comprises a combination of lenses 20, pinhole 21 and photomultiplier 22. The pinhole 21 is located in a position optically conjugate with the tip of probe 102 in relation with the objective 19 and the combination of lenses 20, and the scattering light detection optical system constitutes a cofocal optical system. Thus, light entering the photomultiplier 22 is mostly scattering light generated in the vicinity of the tip of probe 102. The photomultiplier 22 is connected to a high-voltage power supply 23, and outputs an electrical signal according to an intensity of scattering light received. The signal output from the photomultiplier 22 is amplified by an amplifier 24, and applied to the computer 11.

In FIG. 1, although the cantilever tip 100 is shown in such position that an image of a longitudinal axis of the cantilever 101 projected on the upper surface of the prism 3 is parallel in relation to an image of a beam incident to the prism 3 projected on the upper surface of the prism 3, the cantilever tip 100 is positioned such that the image of a longitudinal axis of the cantilever 101 projected on the upper surface of the prism 3 is perpendicular to the image of a beam 107 incident to the prism 3 projected on the upper surface of prism 3, as shown in FIG. 4. In other words, if the image of the beam 107 incident to the prism 3 projected on the upper surface of prism 3 is parallel to Y axis, the cantilever tip 100 is positioned in such direction that the image of a longitudinal axis of the cantilever 101 projected on the upper surface of prism 3 is parallel to X axis.

Figure 5:
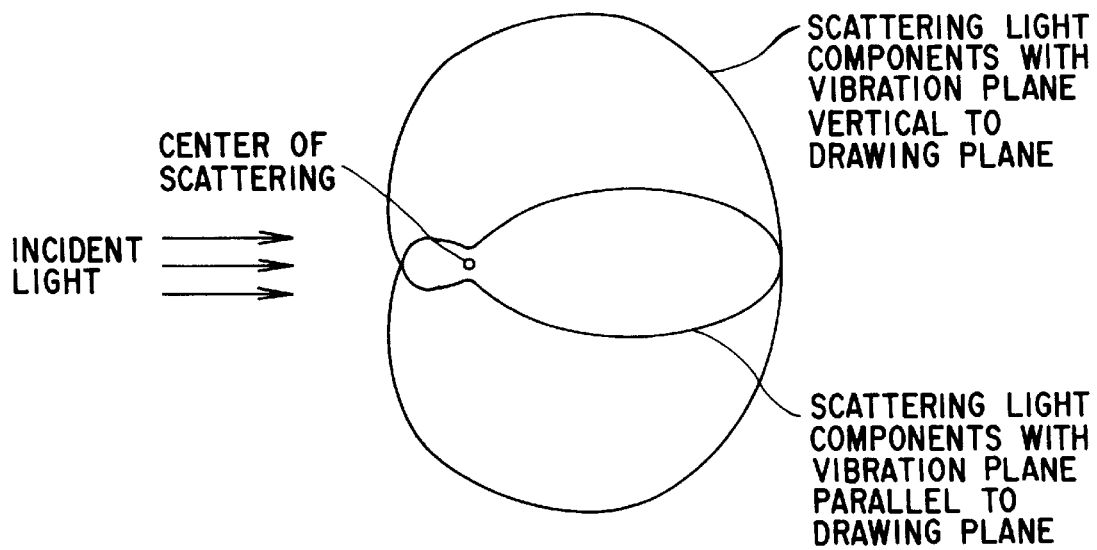
FIG. 5 is an illustration showing a distribution of intensities of scattering light with respect to the scattering direction in Mie scattering.

Scattering caused when the probe is inserted to an evanescent light is Mie scattering, and distribution of intensities of the scattering light with regard to the scattering direction (shown by solid arrows in FIG. 4) is uneven, and is the highest in the advancing direction of incident light 107, as shown in FIG. 5. Therefore, in the case the cantilever tip 100 is positioned in such relation as shown in FIG. 4, the cantilever 101 less blocks off the scattering light of high intensity, specifically scattering light components with a vibration plane parallel to the drawing plane. It contributes to detection of the scattering light with high S/N.

The direction of positioning the cantilever 101 is not limited to such direction that the image of the longitudinal axis thereof projected on the upper surface of prism 3 is perpendicular to the image of the incident beam 107 projected on the upper surface of prism 3. The cantilever 101 may be positioned in any direction as far as the scattering light of high intensity attributable to Mie scattering, that is, scattering light propagating in the right direction in FIG. 5 can be detected.

The aluminum film 104 employed in the back side of cantilever 101 also contributes to detection of the scattering light with high S/N. The aluminum film 104 prevents the scattering light generated at the probe tip from passing through the probe 102 and then entering the objective 19. As a result, only scattering light propagating outside the probe 102 is introduced to the objective 19. Thus, interpretation of a detected light upon analyzing the sample 1 according to the SNOM signal is facilitated.

The aluminum film 104 also prevents the laser beam of above-mentioned optical lever type displacement sensor from entering inside the cantilever 101. Thus, it is avoided that the laser beam enters the cantilever 101, is repetitively reflected in the inside thereof, then, discharged in the vicinity of the probe 102, and the light enters the objective 19, and mixes with the scattering light that should be actually detected. In other words, the aluminum film 104 contributes to improving the S/N of the displacement sensor, as described above, and simultaneously serves for improving the S/N of the scattering light detection optical system.

In the embodiment, although the aluminum film 104 is provided on the back side of cantilever 101, it may be employed on the probe side of the cantilever 101. In addition, although the cantilever 101 is provided with the aluminum film, any film capable of adequately reflecting light and adequately blocking light may be employed in place of the aluminum film 104.

The shape of cantilever is an important factor for achieving detection of the scattering light with high S/N. The cantilever 101 of tetrahedral type described above is one of the most preferable ones for detecting the scattering light with high S/N. The reason is described below by referring to FIG. 6.

In FIG. 6, a cantilever 601 represents a conventional cantilever, and has a projection extending toward a distal end and both sides of a joint with a probe 602. In other words, the probe 602 is located at the distal end of the cantilever 601 with a slight distance from a periphery thereof. If the smallest of angle θt between a line connecting the tip of probe 602 and the periphery of the distal end of cantilever 601 and the optical axis of objective 19 is more than a half angle θL of the angular aperture of the objective 19, light detected by the scattering light detection optical system is only those that are generated in the vicinity of the tip of probe 602, then scattered or diffracted at the periphery of the distal end of cantilever 601. Such condition is undesirable, and it is desired that the scattering light generated in the vicinity of the tip of probe 602 is detected, without being scattered or diffracted at the periphery of the distal end of cantilever 601, by the scattering light detection optical system. For such reason, it is preferred that the cantilever 601 have a smaller projection extending toward the distal end and both sides of the joint with the probe 602. An ideal cantilever has no projection.

Accordingly, it should be appreciated that the cantilever 101 of tetrahedral type described above is provided with no projection extending toward the distal end and both sides of the joint with the probe 102, and has an ideal shape.

An ideal cantilever is not limited to the tetrahedral type. Any cantilever without a projection extending toward a distal end and both sides of a joint with a probe is ideal in a similar manner to the cantilever 101 of tetrahedral type.

Other ideal cantilever tips include, for example, a cantilever tip 200 of so-called bird's beak type shown in FIG. 7. The cantilever tip 200 comprises a cantilever support portion 203, cantilever 201 extending from the cantilever support portion 203 and probe 202 extending at an angle from a distal end of the cantilever 201. The cantilever support portion 203 has a glass member 205, which is located in a surface opposite to that from which the probe 202 is extended. The cantilever 201 is provided with a metal coating layer 204 extending to the tip of probe 202 in a surface opposite to that from which the probe 202 is extended.

As clearly shown in FIG. 7, the cantilever 201 has no projection extending toward the distal end and both sides of the joint with the probe, and it is recognized, therefore, that the cantilever tip 200 of bird's beak type is also an ideal cantilever similarly to the cantilever tip 100 of tetrahedral type.

The apparatus is provided with a microscopic eyepiece lens barrel 28 and microscopic illumination lens barrel 25, both of them are optically coupled with the objective by a half mirror prism 30 positioned above the objective 19, and the microscopic eyepiece lens barrel 28 forms an optical microscope in cooperation with the objective 19, while the microscopic illumination lens barrel 25 forms an illuminating optical system in cooperation with the objective 19. The optical microscope is used, in addition to various optical observation of the sample 1, for identification of an area of the sample 1 to be observed, positioning of the probe 102 to the area to be observed and confirmation of position for emitting the laser beam from the displacement sensor to the cantilever 101.

In principle, during the SNOM measurement, an illumination light source 27 of the illuminating optical system including the microscopic illumination lens barrel 25 is switched off. It is for the purpose of avoiding a noise caused by the illuminating optical system of the optical microscope.

The microscopic illumination lens barrel 25 comprises a half mirror prism 370 for bright field illumination and a half mirror prism 910 for dark field illumination (see FIG. 10), either one of which is selectively positioned in the optical path. When the half mirror prism 910 for dark field illumination is positioned in the optical path, the illuminating optical system functions as means for generating the propagating electromagnetic field between the sample 1 and probe 102. This will be described later in detail. Until then, it is assumed that the half mirror prism 370 for bright field illumination is positioned in the optical path.

The microscopic eyepiece lens barrel 28 is attached to a stage 29 for adjusting the level of such surface to be observed as the back side of cantilever 101 and the surface of the sample 1, and is vertically moved, whenever it is required, by the stage 29. A CCD camera 32 is fixed to the microscopic eyepiece lens barrel 28 for acquisition of an image, and the image acquired by the CCD camera 32 is transmitted to a CCD camera control unit 33, and displayed by a monitor display 34. The microscopic illumination lens barrel 25 is connected via an optical fiber 26 to the illumination light source 27.

The illumination light emitted by the illumination light source 27 is directed via the optical fiber 26, microscopic illumination lens barrel 25, lens 31, half mirror prism 30 and objective 19 to the sample 1. Light from the sample 1 is directed via the objective 19, half mirror prism 30, lens 31, half mirror prism 370 and mirror prism 371 to the microscopic eyepiece lens barrel 28, and focused on a light receiving surface of the CCD camera 32. The image acquired by the CCD camera 32 is displayed by the monitor display 34.

Inside the microscopic illumination lens barrel 25, a polarizer 362 is provided in such manner that it can be suitably placed in the optical path, and an analyzer 363 is provided in the microscopic eyepiece lens barrel 28 such that it can be suitably placed in the optical path. Between the objective 19 and half mirror prism 30, a Nomarski differential interference prism 360 is employed in such manner that it can be suitably positioned in the optical path, and a Nomarski differential interference prism 361 is provided between the half mirror prism 30 and scattering light detection lens barrel 222 so that it can be suitably located in the optical path.

According to the constitution described above, the optical microscope can be used for conducting a general optical microscopic observation, polarization microscopic observation and Nomarski differential interference microscopic observation. When the general optical microscopic observation is conducted, all of the polarizer 362, analyzer 363 and Nomarski differential interference prism 360 are removed from the optical path. In the polarization microscopic observation, the polarizer 362 and analyzer 363 are positioned in the optical path, while the Nomarski differential interference prism 360 is removed therefrom. In the case of the Nomarski differential interference microscopic observation, all of the polarizer 362, analyzer 363 and Nomarski differential interference prism 360 are located in the optical path.

The Nomarski differential interference prism 361 is positioned in the optical path in conjunction with the Nomarski differential interference prism 360. In other words, the Nomarski differential interference prism 361 is also removed from the optical path, when the Nomarski differential interference prism 360 is removed from the optical path, while it is also located in the optical path, when the Nomarski differential interference prism 360 is in the optical path. This allows for compensating separation of the scattering light by the Nomarski differential interference prism 360. That is, the scattering light caused by the probe 102 is separated to polarized components perpendicular to each other by the Nomarski differential interference prism 360, and the two polarized components propagate through different optical paths. Thus, in such condition, one of the polarized components is not directed to the pinhole 21, and cannot be detected by the photomultiplier 22. The Nomarski differential interference prism 361 is provided for eliminating such condition, and allows the polarized light component which is out of the proper optical path to be directed to the pinhole 21.

In the apparatus according to the embodiment, the AFM measurement is taken place simultaneously with the SNOM measurement. It means that acquisition of SNOM information and that of AFM information are achieved during a single scanning operation. The AFM measurement is available in various modes according to a particular manner of Z control between the probe tip and the sample surface, and can be roughly classified to a static mode in which the cantilever is supported in a static attitude and a dynamic mode in which the cantilever is subjected to slight vibrations. The static mode includes a contact mode in which the probe is brought into contact with the sample and a non-contact mode in which a spacing is maintained between the probe tip and the sample surface. The dynamic mode includes a shared force mode in which the probe is vibrated in the direction parallel to the sample surface and a mode in which the probe is vibrated in the direction vertical to the sample surface, and the vertical vibration mode further consist of a contact mode in which the probe tip is brought into contact with the sample surface, that is, so-called tapping mode for allowing the probe tip to tap the sample surface and a noncontact mode in which a spacing is maintained between the probe tip and the sample surface.

While the probe is scanned across a surface of sample, the Z control is effected in any mode between the probe tip and the sample surface. During the scanning operation, a control signal generated for the Z control by the control circuit 9 is applied as AFM information to the computer 11, and processed in combination with an XY scanning signal generated therein. Accordingly, an AFM image representing configuration of the surface of sample is formed. During the scanning operation, an output signal from the photomultiplier 22 is also applied to the computer 11 as SNOM information, and processed in combination with the XY scanning signal generated therein. Thus, an SNOM image representing optical information of the surface of sample is formed. The AFM and SNOM images are jointly displayed by the monitor 12.

As described above, in the Nomarski differential interference microscopic observation, the scattering light caused by the probe 102 is separated by the Nomarski differential interference prism 360 to the polarized components perpendicular to each other, and the two polarized components propagate through the different optical paths. In the apparatus shown in FIG. 1, although the Nomarski differential interference prism 361 for compensation is inserted to the optical path in conjunction with the Nomarski differential interference prism 360 inserted to the optical path, so that a difference between the optical paths of two polarized components are compensated, the two polarized components may be separately detected without use of such compensation. An arrangement for this purpose is shown in FIG. 8.

Figure 8:
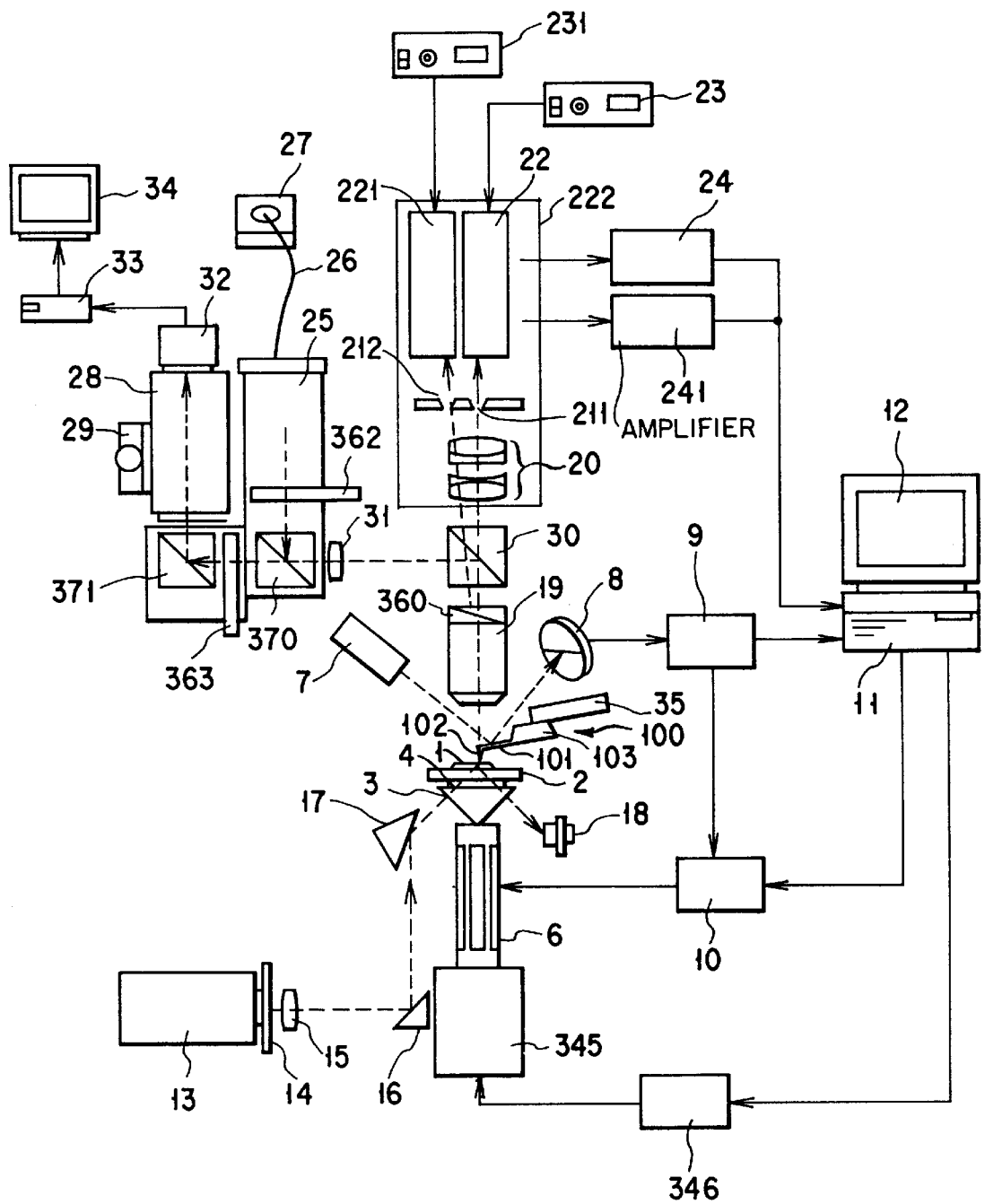
FIG. 8 illustrates a modification of the apparatus in FIG. 1 for independently detecting two polarized light components separated by a Nomarski differential interference prism.

In FIG. 8, the scattering light detection lens barrel 222 has two photomultipliers 22 and 221, a pinhole 211 is provided before the photomultiplier 22, and a pinhole 212 before the photomultiplier 221. The pinhole 211 is located in a position optically conjugate with the tip of probe 102 for a polarized light component that passes straight through the Nomarski differential interference prism 360, while the pinhole 212 is arranged in a position optically conjugate with the tip of probe 102 for a polarized light component that is refracted by the Nomarski differential interference prism 360. The photomultiplier 22 is connected to the high-voltage power source 23 for the photomultiplier, and outputs an electrical signal in response to an intensity of the polarized light component received, and the output signal is amplified by the amplifier 24, and applied to the computer 11. Similarly, the photomultiplier 221 is connected to a high-voltage power source 231 for the photomultiplier, and outputs an electrical signal in response to an intensity of polarized light component received, and the output signal is amplified by the amplifier 241, and applied to the computer 11.

The scattering light caused by introduction of the probe to the evanescent light is separated to the two polarized light components by the Nomarski differential interference prism 360, after it passes through the objective 19. One of the polarized light components passes straight through the prism 360, while the other polarized light component is refracted by the prism 360. The polarized light component passing straight through the prism 360 is collected by the combination of lenses 20, and transmitted through the pinhole 211 to the photomultiplier 22. The polarized light component refracted by the prism 360 is collected by the combination of lenses 20, and transmitted through the pinhole 212 to the photomultiplier 222.

In the apparatus, because the two polarized light components separated by the Nomarski differential interference prism 360 are separately detected, optical information of the sample associated with polarization of scattering light can be obtained.

Figure 9:
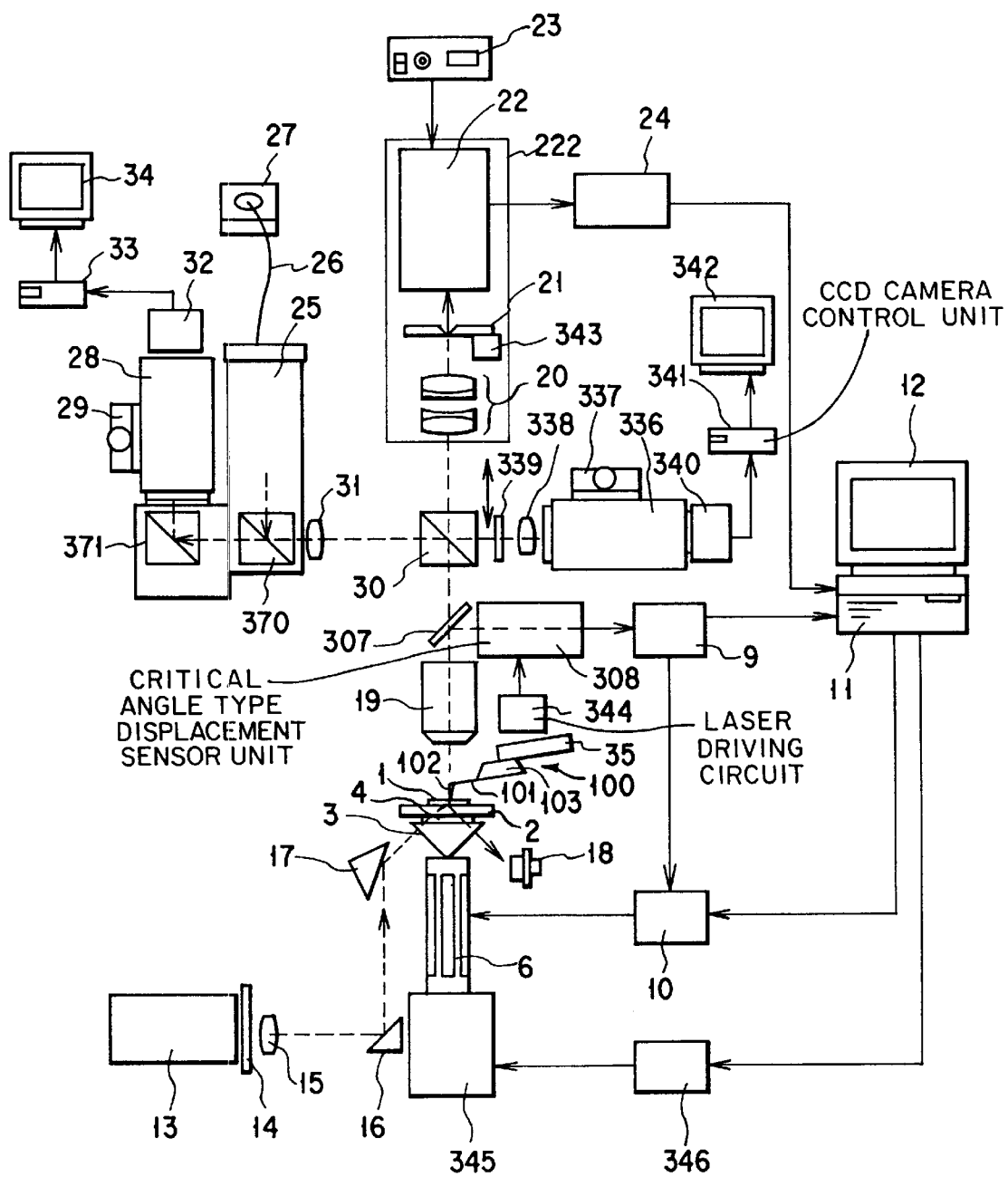
FIG. 9 shows a representation of another modification of the apparatus in FIG. 1 for detecting displacement of a free end of the cantilever with a displacement sensor by critical angle method.

In the apparatus shown in FIG. 1, although the optical lever type displacement sensor is employed for detecting displacement of the free end of cantilever 101, another displacement sensor may be used. An arrangement with a critical angle type displacement sensor is shown in FIG. 9. In FIG. 9, optical devices required for polarization microscopic observation and Nomarski differential interference microscopic observation are not shown.

The apparatus comprises a critical angle type displacement sensor unit 308, and the displacement sensor unit 308 cooperates with the objective 19 to form the critical angle type displacement sensor for detecting displacement of the free end of cantilever 101. Such critical angle type displacement sensors are well known in the art, an example of which is disclosed in U.S. Pat. No. 4,726,685. A dichroic mirror 307 is provided above the objective 19, and the displacement sensor unit 308 is, therefore, optically coupled with the objective 19.

The critical angle type displacement sensor unit 308 serves for emitting a laser beam of 780 nm in wavelength, for example, according to a driving signal of the laser driving circuit 344, and the laser beam is collected by the objective 19, and focused on the back side of cantilever 101. Although the back side of probe 102 is the most preferable position of focusing the laser beam in order to accurately determine the displacement of probe 102, in practice, to avoid mixture with the scattering light during NOM measurement, a point slightly to the side of support portion 103 is selected. Light reflected from the back side of cantilever 101 is directed back to the critical angle type displacement sensor 308, and the critical angle type displacement sensor 308 outputs an error signal corresponding to a shift from the focal point. The error signal is applied to the computer 11 as a displacement signal of the free end of cantilever 101.

In the apparatus, because the critical angle type displacement sensor used is of a coaxial illumination type, the objective 19 can be placed more closely to the cantilever 101 than it is in the apparatus in FIG. 1. Thus, in comparison with the apparatus in FIG. 1, the apparatus in FIG. 9 is capable of providing higher magnification and higher NA, and the objective may have a shorter working distance. Specifically, the objective may be of 50 magnifications with NA at 0.5. Use of the objective of higher NA increases a solid angle over which scattering light is collected, in other words, allows more scattering light to be collected, and contributes to improvement of the S/N in SNOM measurement.

The apparatus shown in FIG. 9 comprises a position adjustment stage 343 for adjusting a position of the pinhole 21. The apparatus further comprises a lens 338 and eyepiece lens barrel 336, and the lens 338 and eyepiece lens barrel 336 are optically coupled with the combination of lenses 20 by means of the half mirror prism 30, and forms an optical system for adjusting the position of pinhole 21 in cooperation with the combination of lenses 20. The eyepiece lens barrel 336 is attached to a stage 337 for confirming that the focus is on a surface to be observed, i.e., the position of pinhole 21, and can be moved laterally in a suitable manner by the stage 337. A CCD camera 340 for acquiring an image is fixed to the eyepiece lens barrel 336, and an image acquired by the CCD camera 340 is transmitted to the CCD camera control unit 341, and displayed by the monitor display 342.

Between the lens 338 and half mirror prism 30, a shutter 339 is provided in such manner that it can be suitably inserted to the optical path. The shutter 339 is dislocated from the optical path during position adjustment of the pinhole 21. Except when the position adjustment of the pinhole 21 is conducted, it is placed in the optical path. Otherwise, in optical microscopic observation and SNOM measurement, a stray light (reflected light) either from the lens 338 or eyepiece lens barrel 336 might affect the observation and measurement.

Effects of a stray light can just as well be avoided by providing a mechanism for removing the optical system including the lens 338 and eyepiece lens barrel 336 from the optical path instead of providing the shutter 339.

During the position adjustment operation for the pinhole 21, the illumination light source 27 of the illuminating optical system is switched off. In the case the scattering light caused by the probe 102 is accurately directed to the pinhole 21, the CCD camera 340 senses almost no light. If the scattering light caused by the probe 102 is not accurately directed to the pinhole 21, as the light is scattered at an edge of the pinhole 21, the CCD camera 340 senses the light. Therefore, the position adjustment can be achieved by confirming the condition by means of the monitor display 342, and moving the pinhole 21 using the position adjustment stage 343.

It has already been described that the electromagnetic field generating means comprises means for generating a localized electromagnetic field which is localized without propagation and means for generating a propagating electromagnetic field, and that either one of them is selectively operated. It has been also described that the microscopic illumination lens barrel 25 comprises the half mirror prism 370 for bright field illumination and the half mirror prism 910 for dark field illumination, that either one of them is selectively operated, and that the illuminating optical system functions as means for generating the propagating electromagnetic field between the sample 1 and probe 102, when the half mirror prism 910 for dark field illumination is positioned in the optical path. This is further described in detail below.

As shown in FIG. 10, the half mirror prism 910 for dark field illumination has a circular shade portion 911 in the middle of a surface receiving incident illumination light. The half mirror prism 910 for dark field illumination is secured to a slider 804 together with the half mirror prism 370 for bright field illumination, and the slider 804 is movably provided in relation to a base 802. The base 802 is fixed to the microscopic illumination lens barrel 25, and either one of the half mirror prism 370 for bright field illumination and half mirror prism 910 for dark field illumination is selectively positioned in the optical path, thus switching between the bright field and dark field illuminations can be effected.

Figure 11:
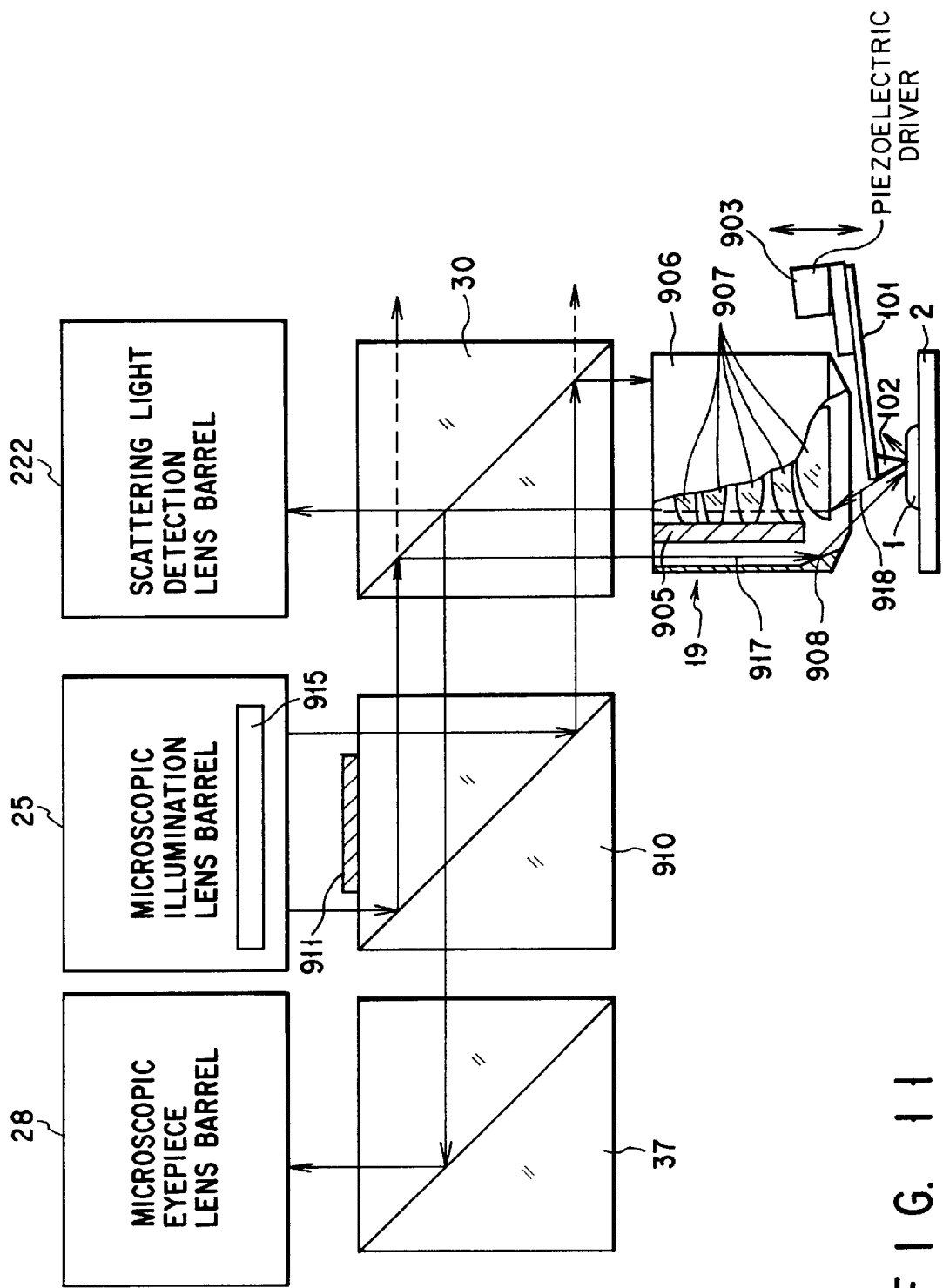
FIG. 11 shows a schematic constitution of the apparatus with dark field illumination, that is, propagation electromagnetic field generating means operated.

An example of the apparatus for dark field illumination, that is, when the propagating electromagnetic field generating means is in operation, is schematically shown in FIG. 11. The objective 19 has a structure suitable for the dark field illumination. In other words, as shown in FIG. 11, a combination of lenses 907 is secured to a lens holding member 905, and the lens holding member 905 is supported inside an objective barrel 906 in the middle thereof. The lens holding member 905 is secured to the objective barrel 906, for example, by screws in three directions. Because of such structure, between the objective barrel 906 and lens holding member 905, a propagation path or spacing for the dark field illumination light can be obtained. The objective barrel 906 contains a mirror 908 for reflecting the illumination light passing through the propagation path to the sample 1.

As an illumination light beam is discharged from the microscopic illumination lens barrel 25, a central portion of the beam is blocked by the circular shade portion 911 in the half mirror prism 910 for dark field illumination, and only an annular periphery portion of the beam is reflected by the half mirror prism 910 for dark field illumination. The annular illumination light beam is reflected by the half mirror prism 30, and enters the annular propagation path in the objective. The illumination light 917 traveling through the propagation path is reflected by the mirror 908, then applied to the sample 1 from outside the angular aperture of objective 19. Then, the propagation electromagnetic field is generated between the probe 102 and sample 1. The illumination light 917 never enters the combination of lenses 907 after it is reflected by the sample 1, because it is applied to the sample 1 from outside the angular aperture of objective 19.

The cantilever 101 is subjected to a slight vibration, for example, by a driving piezoelectric device 903. This corresponds to the AFM measurement in the dynamic mode described above. When the probe 102 is introduced to a propagation area of the illumination light, which is the propagation electromagnetic field, scattering light 918 is caused. The scattering light 918 caused is directed to the combination of lenses 907, passing through the half mirror prism 30, and applied to the scattering light detection lens barrel 222. SNOM information obtained by the scattering light detection lens barrel 222 is processed in a manner similar to that in the case of generating the localized electromagnetic field between the probe 102 and sample 1.

The SNOM measurement may be conducted by providing a polarizer 915 in the optical path inside the microscopic illumination lens barrel 25. The polarizer 362 employed for polarization microscopic observation and Nomarski differential interference microscopic observation as described is applicable as the polarizer 915. By placing the polarizer 915 in the optical path of illumination light, optical information of the surface of sample associated with the direction of polarization of the illumination light can be obtained.

In the apparatus, because light for generating the electromagnetic field between the probe 102 and sample 1, that is, the illumination light 917, is applied to the sample 1 from the side of cantilever 101 with respect to the sample 1, the sample 1 to be observed is not limited to be optically transparent. In other words, with the apparatus, SNOM measurement can be achieved for optically opaque samples.

In the case the sample 1 is illuminated by using the arrangement of FIG. 11, the localized electromagnetic field may be generated in the vicinity of the surface of sample 1. Such phenomenon is attributable to a structure and material of the sample, and the evanescent light or localized electromagnetic field is possibly present in the vicinity of the surface of sample 1. Then, the localized electromagnetic field can be detected, and made use of for structural analysis of the sample. Thus, the dark field illumination can function as means for generating the localized electromagnetic field.

The localized electromagnetic field may be coincidentally caused with the propagating electromagnetic field. In such case, the localized and propagating electromagnetic fields can be similarly detected as well, and made use of for structural analysis of the sample 1.

Additional advantages and modifications will readily occur to those skilled in the art. Therefore, the invention in its broader aspects is not limited to the specified details, and representative devices shown and described herein. Accordingly, various modifications may be made without departing from the spirit or scope of the general inventive concept as defined by the appended claims and their equivalents.

What is claimed is:

1. A scanning probe microscope for obtaining optical information relating to a surface of a sample, said scanning probe microscope comprising:

a cantilever having a probe at a free end thereof;

a scanner for scanning the probe across the surface of the sample;

a controller for controlling a distance between a tip of the probe and the surface of the sample;

a displacement detector for detecting a displacement of the free end of the cantilever;

an electromagnetic field generator for generating an electromagnetic field between the probe and the sample;

a light detector for detecting light generated by an effect of the probe on the electromagnetic field;

an information processor for processing information output by the scanner, the displacement detector and the light detector to thereby form an image related to the surface of sample; and a display for displaying the processed information, wherein the light detector includes an objective placed on an opposite side of the sample with respect to the cantilever, and the objective has an angular aperture exceeding a vertical angle of the probe, said angular aperture being an angle from a focal point of the objective to a diameter of entrance pupil and a maximum angle of a cone of luminous flux entering the objective, with a sine of a half angle thereof corresponding to a numerical aperture of the objective.

2. The scanning probe microscope according to claim 1, wherein the light detector comprises a confocal optical system, said confocal optical system including a pinhole provided at a confocal point in relation to the tip of the probe and a light receiving device for detecting light that passes through the pinhole.

3. The scanning probe microscope according to claim 1, wherein the probe is provided at a distal end of the free end of cantilever.

4. The scanning probe microscope according to claim 3, wherein the cantilever comprises a tetrahedral type cantilever, the probe is in the shape of a trigonal pyramid, and the shape of a joint between the cantilever and the probe is identical to a shape of the distal end of the free end of the cantilever so that the cantilever has no projection extending outside the joint with the probe.

5. The scanning probe microscope according to claim 3, wherein the cantilever comprises a bird's beak type cantilever, and the probe is projected obliquely from the distal end of the free end of the cantilever.

6. The scanning probe microscope according to claim 1, wherein the cantilever comprises a shade film for blocking light passing through an inside of the probe.

7. The scanning probe microscope according to claim 6, wherein the shade film comprises a metal film formed on a surface of the cantilever on a side opposite to the probe.

8. The scanning probe microscope according to claim 1, wherein the electromagnetic field generator comprises an interior total reflection prism disposed below the sample, and a generator for applying light to an interface between the sample and the interior total reflection prism at an angle for causing total reflection so as to generate a localized, non-propagating electromagnetic field between the probe and sample.

9. The scanning probe microscope according to claim 8, wherein the cantilever is positioned such that a longitudinal axis thereof is perpendicular to an optical path of the electromagnetic field generator.

10. The scanning probe microscope according to claim 8, wherein the localized electromagnetic field generated by the electromagnetic field generator comprises an evanescent light field near the surface of the sample.

11. The scanning probe microscope according to claim 1, wherein the electromagnetic field generator comprises an optical system for illuminating the sample from outside the angular aperture of the objective from a side of the cantilever with respect to the sample, and generates a propagating electromagnetic field between the probe and sample.

12. The scanning probe microscope according to claim 11, further comprising an optical microscope commonly using the objective of the light detector, wherein the electromagnetic field generator provides dark field illumination for the optical microscope.

13. The scanning probe microscope according to claim 1, further comprising an optical microscope commonly using the objective of the light detector.

14. The scanning probe microscope according to claim 13, wherein the optical microscope comprises a polarization microscope.

15. The scanning probe microscope according to claim 13, wherein the optical microscope comprises a Nomarski differential interference microscope.

16. The scanning probe microscope according to claim 1, wherein the electromagnetic field generator comprises an optical system for illuminating the sample from outside the aperture of the objective from a side of the cantilever with respect to the sample, and generates a localized, non-propagating electromagnetic field between the probe and sample.

17. The scanning probe microscope according to claim 16, further comprising an optical microscope commonly using the objective of the light detector, wherein the electromagnetic field generator provides dark field illumination for the optical microscope.

18. The scanning probe microscope according to claim 1, wherein the displacement detector obtains AFM information based on the detected displacement of the free end of the cantilever, and the controller controls the distance between the tip of the probe and the surface of the sample based on the obtained AFM information.

19. The scanning probe microscope according to claim 1, wherein the displacement detector comprises an optical lever type displacement sensor for detecting the displacement of the free end of the cantilever, and the displacement sensor includes a semiconductor laser for irradiating the cantilever with a laser beam and a photodetector for receiving a reflection light beam reflected by the cantilever.

20. The scanning probe microscope according to claim 19, wherein the semiconductor laser irradiates the cantilever such that the laser beam is incident on the cantilever at a position shifted from a back side of the probe to a support portion.

* * * * *